(12) United States Patent
Wang et al.

(10) Patent No.: US 10,664,868 B2
(45) Date of Patent: May 26, 2020

(54) SYSTEMS AND METHODS FOR PROVIDING PERSONALIZED PROACTIVE INTERACTION

(71) Applicant: Five9, Inc., San Ramon, CA (US)

(72) Inventors: Danny Hsiang-Kuo Wang, Dublin, CA (US); James J. Hickey, San Jose, CA (US); Ilya A. Harahap, San Jose, CA (US); John R. D'Amour, Sunnyvale, CA (US); Piotr K. Chojnowski, Sunnyvale, CA (US); Gaurav Passi, San Ramon, CA (US)

(73) Assignee: Five9, Inc., San Ramon, CA (US)

( * ) Notice: Subject to any disclaimer, the term of this patent is extended or adjusted under 35 U.S.C. 154(b) by 292 days.

(21) Appl. No.: 15/659,762

(22) Filed: Jul. 26, 2017

(65) Prior Publication Data

US 2018/0033042 A1      Feb. 1, 2018

Related U.S. Application Data

(60) Provisional application No. 62/368,392, filed on Jul. 29, 2016.

(51) Int. Cl.
*G06Q 30/02* (2012.01)
*G06F 16/9535* (2019.01)
(Continued)

(52) U.S. Cl.
CPC ..... *G06Q 30/0255* (2013.01); *G06F 16/9535* (2019.01); *G06Q 30/016* (2013.01);
(Continued)

(58) Field of Classification Search
None
See application file for complete search history.

(56) References Cited

U.S. PATENT DOCUMENTS 6,094,673 A * 7/2000 Dilip ............... G06Q 10/10
709/202
8,843,851 B1 * 9/2014 Gotchy ............ G06Q 10/10
715/708

(Continued)

OTHER PUBLICATIONS

Extended European Search Report, dated Nov. 14, 2017 from related EP Patent Application No. 17183447.6.

*Primary Examiner* — Younes Naji
(74) *Attorney, Agent, or Firm* — Jones Day

(57) ABSTRACT

Systems and method are provided for synchronizing communications between two disparate computing systems. A context capture module is configured to capture interactions of a first computing system with an application to determine a current context of the first computing system's interactions. A communications initiation engine is configured to determine one of a plurality of other computing systems is to be queried for communication with the first computing system. When one of the other computing systems is to be queried, an initiation communication is provided to a particular one of the other computing systems, where the initiation communication includes data describing the current context of the first computing system's interactions. An availability indication is received from the particular other computing system. A communications module is configured to facilitate communications between the first computing system and the particular other computing system.

15 Claims, 10 Drawing Sheets

(51) Int. Cl.
*G06Q 30/06* (2012.01)
*G06Q 30/00* (2012.01)
*H04L 12/58* (2006.01)

(52) U.S. Cl.
CPC ..... *G06Q 30/0601* (2013.01); *G06Q 30/0631* (2013.01); *H04L 51/02* (2013.01); *H04L 51/046* (2013.01)

(56) References Cited

U.S. PATENT DOCUMENTS

| | | | |
|---|---|---|---|
| 9,253,550 B1* | 2/2016 | Smith | H04N 21/812 |
| 2003/0053615 A1 | 3/2003 | Anderson et al. | |
| 2010/0306153 A1 | 12/2010 | Mu et al. | |
| 2011/0116617 A1* | 5/2011 | Fan | H04M 3/5232 |
| | | | 379/265.11 |
| 2013/0246943 A1* | 9/2013 | Goodman | H04L 67/02 |
| | | | 715/760 |
| 2013/0326375 A1 | 12/2013 | Barak et al. | |
| 2014/0100902 A1* | 4/2014 | Godfrey | G06Q 30/06 |
| | | | 705/7.13 |
| 2014/0140498 A1* | 5/2014 | Mezhibovsky | H04M 3/5232 |
| | | | 379/265.13 |
| 2014/0215008 A1* | 7/2014 | Wiles | H04L 67/10 |
| | | | 709/217 |
| 2016/0140635 A1 | 5/2016 | Devageorge et al. | |
| 2016/0239897 A1* | 8/2016 | Ghose | G06Q 30/0625 |
| 2018/0011678 A1* | 1/2018 | Shipper | G06F 3/0482 |

* cited by examiner

39029; Priority Level - Gold; Checkout; 4:20; 28:30; Help with Shipping Options; 100

98430; Silver; Product X; 2:15; 8:40; Question about Product; 75

89442; Bronze; Search Results; 1:30; 9:25; Question about Product Differences; 55

19322; Unknown; Front; 0:55; 0:55; Unknown; 30

Agent Aardvark

FIG. 5

98430; Silver; Product X; 2:15; 8:40; Question about Product; 100

39029; Priority Level - Gold; Checkout; 4:20; 28:30; Help with Shipping Options; 75

89442; Bronze; Search Results; 1:30; 9:25; Question about Product Differences; 40

19322; Unknown; Front; 0:55; 0:55; Unknown; 30

Agent Toolman

FIG. 6

```
┌─────────────────────────────────────────────────────────────┐
│ Capture interactions of first computing system with an      │
│ application to determine a current context                  │
│ 1002                                                        │
└─────────────────────────────────────────────────────────────┘
                              │
                              ▼
┌─────────────────────────────────────────────────────────────┐
│ Determining that one of a plurality of other computing      │
│ systems are to be queried for communication with the first  │
│ computing systems                                           │
│ 1004                                                        │
└─────────────────────────────────────────────────────────────┘
                              │
                              ▼
┌─────────────────────────────────────────────────────────────┐
│ Providing an initiation communication to a particular one   │
│ of the other computing systems including data describing    │
│ the current context of the first computing system's         │
│ interactions                                                │
│ 1006                                                        │
└─────────────────────────────────────────────────────────────┘
                              │
                              ▼
┌─────────────────────────────────────────────────────────────┐
│ Receiving an availability interaction from the particular   │
│ other computing system                                      │
│ 1008                                                        │
└─────────────────────────────────────────────────────────────┘
                              │
                              ▼
┌─────────────────────────────────────────────────────────────┐
│ Facilitating Communications between the first computing     │
│ system and the particular other computing system            │
│ 1010                                                        │
└─────────────────────────────────────────────────────────────┘
```

FIG. 10

SYSTEMS AND METHODS FOR PROVIDING PERSONALIZED PROACTIVE INTERACTION

CROSS-REFERENCE TO RELATED APPLICATIONS

This application claims priority to U.S. Provisional Application No. 62/368,392, filed Jul. 29, 2016, the entirety of which is herein incorporated by reference.

BACKGROUND

Today, visitors to a company's website are familiar with the generic chat invitation "pop-up" messages that invite the visitor to engage in a chat with a contact center agent. This is commonly referred to as "Proactive Chat." There are a number of shortcomings with the current approach.

SUMMARY

Systems and method are provided for synchronizing communications between two disparate computing systems. In one example, a system includes a context capture module configured to capture interactions of a first computing system with an application to determine a current context of the first computing system's interactions. A communications initiation engine is configured to determine one of a plurality of other computing systems is to be queried for communication with the first computing system. When one of the other computing systems is to be queried, an initiation communication is provided to a particular one of the other computing systems, wherein the initiation communication includes data describing the current context of the first computing system's interactions. An availability indication is received from the particular other computing system. A communications module is configured to facilitate communications between the first computing system and the particular other computing system.

As another example, a method for synchronizing communications between two disparate computing systems includes capturing interactions of a first computing system with an application to determine a current context of the first computing system's interactions. A determination is made that one of a plurality of other computing systems is to be queried for communication with the first computing system. When one of the other computing systems is to be queried, an initiation communication is provided to a particular one of the other computing systems, wherein the initiation communication includes data describing the current context of the first computing system's interactions. An availability indication is received from the particular other computing system, and communications between the first computing system and the particular other computing system are facilitated.

As a further example, a computer-readable medium is encoded with instructions for commanding one or more data processors to execute steps of a method for synchronizing communications between two disparate computing systems. In the method, interactions of a first computing system with an application are captured to determine a current context of the first computing system's interactions. A determination is made that one of a plurality of other computing systems is to be queried for communication with the first computing system. When one of the other computing systems is to be queried, an initiation communication is provided to a particular one of the other computing systems, wherein the initiation communication includes data describing the current context of the first computing system's interactions. An availability indication is received from the particular other computing system, and communications between the first computing system and the particular other computing system are facilitated.

BRIEF DESCRIPTION OF THE DRAWINGS

FIG. 5 is a diagram depicting a priority queue for a first agent.

FIG. 6 is a diagram depicting a priority queue for a second agent who has significant knowledge about certain types of products.

FIG. 10 is a flow diagram depicting a computer-implemented method of synchronizing communications between two disparate computing systems.

DETAILED DESCRIPTION

Figure 1:
FIG. 1 is a diagram depicting a preview work item routing interface.

A proactive chat is often presented in a bottom-right corner of a web page or as an overlay to a web page that a user is currently browsing. The proactive chat offers the user an opportunity to enter a question or indicate a problem that the user is currently having. Web site owners provide such proactive chats as a mechanism to prevent session abandonment by a user. For example, a user interacting with a merchant web site may identify an item that they wish to purchase and command that the item be placed in a shopping cart. Upon reaching a check out screen, the user may become stalled when asked to enter a CVV number for their credit card. If the user becomes frustrated because they do not know what a CVV number is or where to find it, they may become frustrated and leave the web site. This results in a lost sale for the web site owner, where the user likely would have purchased the item, had they not become frustrated.

In some implementations, a proactive chat is not always presented as an option for the user to communicate with a live agent or an automated chat-bot programmed to answer questions. Instead, a proactive chat is presented to the user based on certain criteria that are indicative of a user's workflow becoming stymied, such that frustration and session abandonment could occur. In one example, a proactive chat presentation criteria includes the user being on a check out web page of a web site for more than a threshold period of time without progressing. While certain examples herein are described in the context of a proactive chat, other mechanisms for communicating with a user are also contemplated by this disclosure including internet voice call, public network telephone-based call, a call scheduling offer, an SMS, and a chat-bot.

Proactive chat implementations can be sub-optimal in some implementations. For example, the chat invite pop-up could be triggered by a simple time-on-page timer or a pages visited counter without any further consideration of the appropriateness for the timing of the pop-up. In another instance, the chat invite pop-up is too generic in nature, having only a standard greeting or invitation message pertaining, in many cases, only to the web page that the user is currently viewing. Such an invite may not offer the user sufficient hope of addressing their current frustration, pushing the user away from using the proactive chat option. In other implementations, accepting the chat invite places the user in a contact center queue. The following wait for an agent to become available could result in session abandonment.

Systems and methods described herein address the many shortcomings of the currently available approaches by providing a method for a contact center agent to initiate a personalized, proactive, context-based interaction with a website visitor user, in a timely manner, and without exposing the visitor to queuing time in the contact center. In certain embodiments, an agent who will be participating in the interaction is provided with context information of a user's current experience before an interaction invitation is sent to the user, such that the agent can provide a personalized invitation that does not result in a queuing delay.

FIG. 1 is a diagram depicting a preview work item routing interface that can facilitate an agent deciding whether/when to initiate a communications session with a user and to manage that communication session, with a goal of contacting the user at the proper time (i.e., not too soon, but not too late) to maximize the chances of influencing behavior. As discussed further herein, a system evaluates the sessions of a number of users of a website to track a session status and other metrics of session. When session metrics reach a predetermined criteria or criteria determined by machine learning/artificial intelligence, that user's session is deemed a candidate contact (e.g., via a proactive chat, a social media message, a web/phone call). The system routes the user's session to an agent queue 102 (e.g., a next available agent, a most qualified agent for addressing a detected difficulty that the user is having). By selecting a queued user, additional details of the user, the user's current and historical session, and other metrics are displayed to inform the agents decision on whether to contact the selected user.

For example user details (e.g., a name or session identifier) are depicted at 104. Where a user is logged into the website or user details are otherwise tied to the session, such as through cookies or other biographic info received via previous visits to the website, a user's name is provided. Tracking a user across sessions/visits to the website enables the website to provide more comprehensive historic data regarding the user to the agent. Historic data also enables predictive engines to better predict the user's behavior. The preview work item interface 100 includes a customer journey display 106 that indicates their path through the website during their current session. In the example of FIG. 1, that customer journey display 106 is depicted using a timeline that highlights a length of time spent on each webpage and actions taken on those web pages. A journey history section 108 depicts details of past sessions, where those past sessions can be selected and drilled down on for additional details (e.g., to view a session website traversal timeline similar to the customer journey display 106). An outcomes probability display 110 indicates a likelihood of different results for this visit of the user. Where the user's identity is known, a predictive engine can inform its predictions based on prior visits of the user (e.g., when the visit has visited X web page on the website and has spent more than 4 minutes on X web page, the user has purchased items 78% of the time; the user has recently purchased a product, so there is a greater chance that their visit to the website is to register that purchased product). When the user's identity is not known, the predictive engine can base its predictions off of a generic or average user's behavior.

Using the outcomes probability display, the customer journey display, or other biographic information depicted in the preview work item 100, the agent can determine when is a best time to communicate with the user. If the user's session appears to be progressing without issue, no communication may be warranted. If the user appears to be having a technical issue (e.g., a credit card will not process), then a communication for technical reasons may be warranted. If the user appears to be unsure about making a transaction, a communication to offer an incentive may be productive. The preview work item includes a number of controls for enabling the agent to initiate communications with the depicted user. A number of controls 112, 114 facilitate initiation of communication and continuation of communication, respectively. When not involved in an active, live user communication, the agent can participate in other types of user communications, such as answering emails, responding to users on social media (e.g., Facebook, Twitter), and responding to voicemails (e.g., by initiating a live voice chat).

Figure 2:
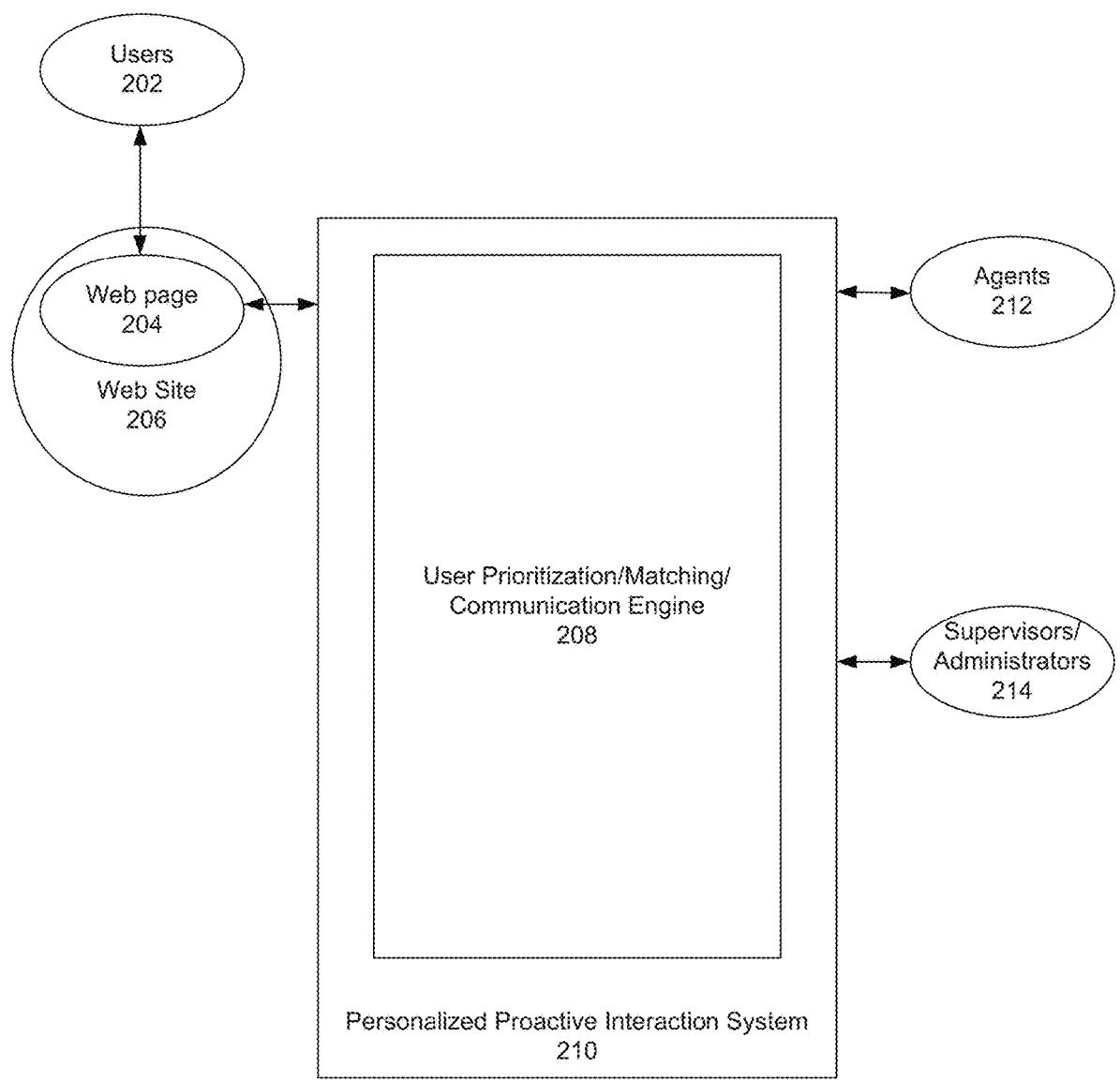
FIG. 2 is a block diagram depicting a personalized proactive interaction system.

FIG. 2 is a block diagram depicting a personalized proactive interaction system. Users 202 interact with one or more web pages 204 of a larger web site 206 (e.g., an e-commerce web site). A user prioritization/matching/communication engine 208 of a personalized proactive interaction system 210 monitors the interactions of the user 202 with the web pages 204 of the web site 206 to generate context information. A user's traversal of the web site 206 may be tracked through the use of session identification information, which can be managed via cookies. The engine 208 tracks information associated with a user's current web site session 206, and in some instances prior sessions, to document the user's current context. For example, the engine 208 may track an identity of the user 202, a history of web pages 204 on the current web site 206 visited by the user 202, a time of the user 202 on a current web page 204, a total time of the user 202 on the web site 206, and potentially other information, such as a shopping cart status of the user (e.g., whether the shopping cart contains any items, the total value of the shopping cart).

Based on the context information, the engine 208 is configured to determine whether the user 202 is likely in need of help, such that it would be beneficial to present that user 202 with a proactive chat option (e.g., a pop-up in a lower right hand corner of a browser, a web page overlay). When it is determined that a proactive chat option should be provided, the engine 208 determines which of a plurality of agents 212 are best suited for participating in that proactive chat. A number of factors may be considered, including a busyness of each agent (e.g., a number of chats in which that agent is currently participating in), an expertise of an agent (e.g., an agent who specializes in knowledge of certain products/services, an agent who is an expert at sales), and how urgent it is that the user receive help. In one example, prioritized queues of users who are determined could benefit from a proactive chat are generated for each agent 212, such that each agent is presented a next user in their prioritized queue for consideration for a proactive chat. Upon presentation of a user 202 to an agent 212 for consideration of a proactive chat (e.g., via a preview work item as depicted in FIG. 1), the agent is presented context information of the user's current experience with the web site 206. The agent 212 can then evaluate the appropriateness of a proactive chat. Should the agent 212 deem that a proactive chat would be beneficial, the agent 212 can initiate the proactive chat option with a greeting that is personalized to the user/and or the context of the user (e.g., "Hi Greg. Can I help you with finding your CVV number on your credit card?"), where the user does not have to wait in a queue for an available agent after the proactive chat option is presented.

The engine 208 can then, in some embodiments, facilitate the proactive chat between the user 202 and the agent 212. The engine 208 can further provide reporting capabilities to supervisors and administrators 214, where such reporting can indicate busyness of not only agents 212, but of the website 206, and the effectiveness of the proactive chat communications (e.g., a number of sessions that result in a completed sale after a proactive chat session is held).

Figure 3:
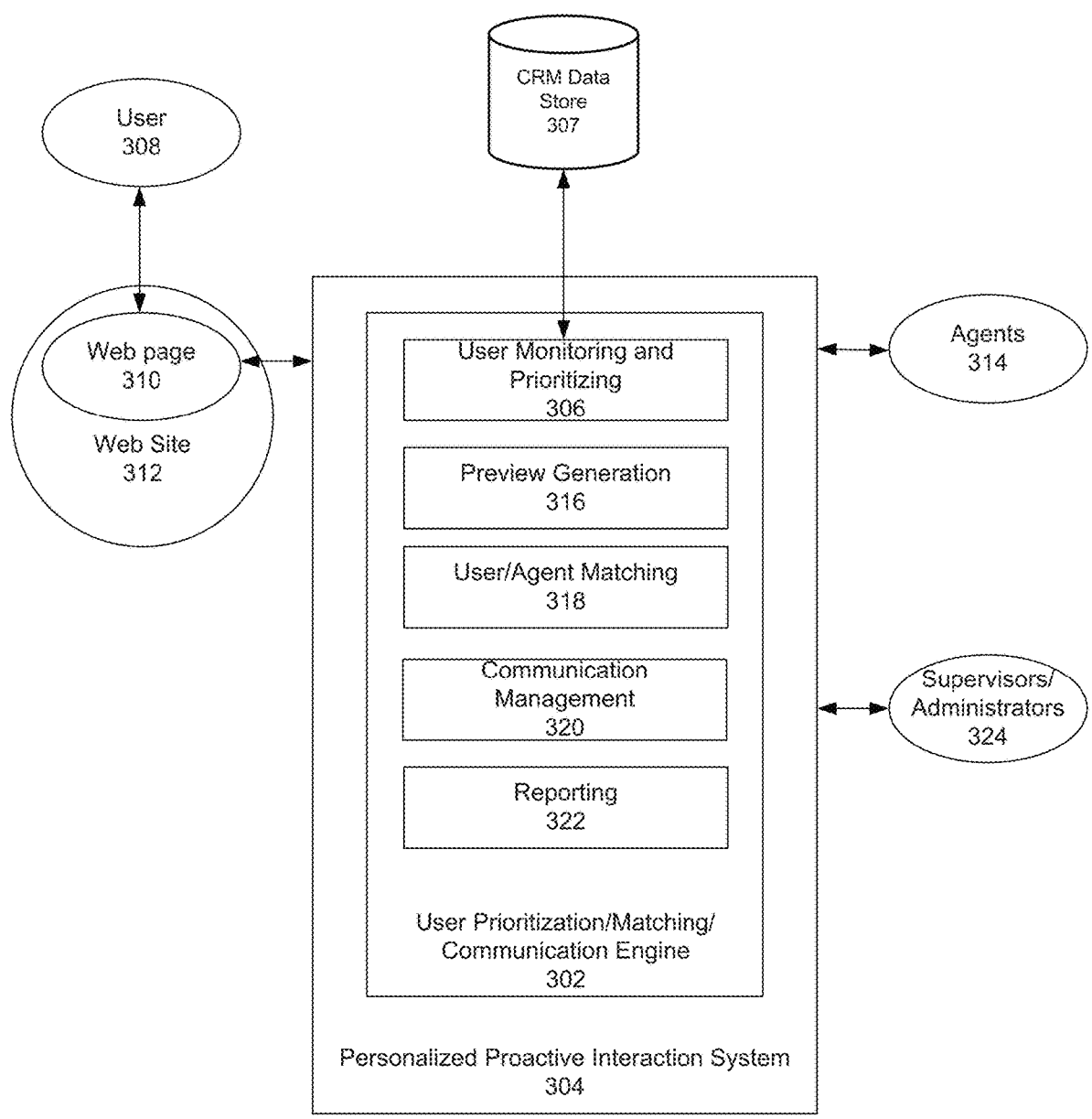
FIG. 3 is a diagram that depicts example functionality of a user prioritization/matching/communication engine of a personalized proactive interaction system.

FIG. 3 is a diagram that depicts example functionality of a user prioritization/matching/communication engine 302 of a personalized proactive interaction system 304. As described above, the engine 302, at 306, monitors a user's 308 experience on web pages 310 of a web site 312 to capture context information. A user's context information representing their web site 312 experience and status can be supplemented by data from a data store (e.g., CRM data store 307) that enables the engine 302 to treat different users 308 differently, depending on previously gained intelligence on the users 308. For example, users 308 who are frequent customers may be treated with a higher level of priority (e.g., proactive chats are prevented faster, more often). As another example, users 308 who have benefited from proactive chats in the past may also be treated with a similar higher level of priority in order to entice performance of the web site 312 goal (e.g., sale conversion).

Based on the context information, the engine 302 determines that a computer system of an agent 314 should be queried for a potential proactive chat. Such querying is based on a priority of the user's perceived need and business levels and expertise of agents. The engine presents a preview display 316, based on the context information for a user 308, to the agent 314 for the agent to determine whether a proactive chat would be beneficial, matching the user 308 with the agent 314, as indicated at 318. Once matched, and a proactive chat session is initiated by the agent 314, the engine can manage the chat 320, facilitating capture, transmission, and display of communications between the parties 308, 314. The engine 302 can also provide reporting capabilities 322 to supervisors, administrators 324, and agents 314 as appropriate to inform those persons of the current or past state of affairs and effectiveness of the engine 302 in promoting system goals.

As noted above, a user prioritization/matching/communication engine is configured to identify users that could benefit from a proactive chat. Proactive chat queries can be automatically generated and sent to agents (e.g., system generated prompts for an agent to consider whether a proactive chat option is appropriate and should be provided to a user). In some implementations, agents may be involved in multiple proactive chats simultaneously (e.g., up to four). Additional users who the engine has determined could benefit from a proactive chat are placed in prioritized queues for one or more agents. In one embodiment, a user can be presented in multiple agents' queues, but once a preview display for a user is presented to an agent, that user is removed or suspended in other agents' queues, such that multiple agents are not concurrently evaluating whether a user should be provided a proactive chat option.

Figure 4:
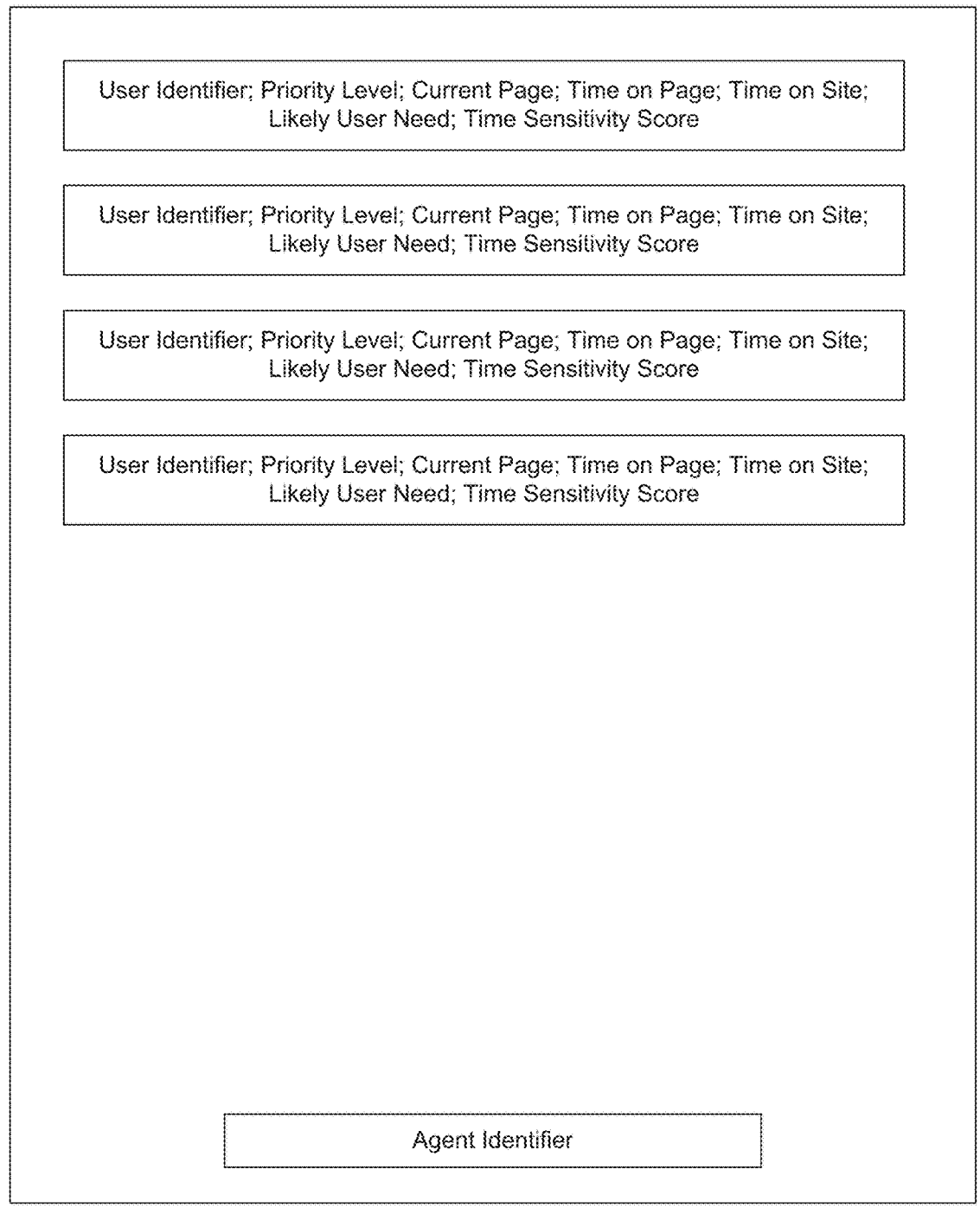
FIG. 4 is a diagram depicting an example priority queue for an agent.

FIG. 4 is a diagram depicting an example priority queue for an agent. Such a data structure or display includes an identifier of an agent and a list of users for whom a proactive chat has been deemed useful by an engine. Once an agent has availability (e.g., the agent is involved in less than a maximum number of proactive chats (e.g., 1, 2, 3, 4)), the agent is provided a preview display for a user having a highest priority in that agent's priority queue. The FIG. 4 data structure or display includes a plurality of records, each record being associated with a user, the records being ordered according to a metric. In the example of FIG. 4, each user record includes a user identifier, a priority level (e.g., a gold user level for frequent users, a silver user level for regular users, a bronze user level for occasional users, and a new user level), a current web page of the web site that the user is viewing, a time the user has spent on that web page, a total time that the user has spent on the web site, and a time sensitivity or other score (e.g., an urgency metric calculated by providing one or more of the user record metrics to a scoring model). The user records are prioritized according to one or more of the user record metrics to determine which user should have a preview item presented to the agent associated with that priority queue next.

FIG. 5 is a diagram depicting a priority queue for a first agent. The queue for the first agent is topped by a gold user, identified 39029, who has been at a checkout screen for 4:20 of his 28:30 spent on the web site. The engine has determined that this user likely needs help with shipping options. Possibly because this user is close to a sale conversion and they are a regular customer, this user is of a highest priority to Agent Aardvark. Subsequent customers are on other pages, having different determined needs, where the presented users are ordered according to a time sensitivity score (100, 75, 55, 30, respectively) that indicates a likelihood that the associated user will abandon their session if they are not helped soon, such as via a proactive chat.

In one embodiment, priority queues for different agents can include different users and/or different ordering of users. FIG. 6 is a diagram depicting a priority queue for a second agent who has significant knowledge about certain types of products. The queue of FIG. 6 is also ordered according to a score field having respective values of 100, 75, 40, 30. While the same customers are in Agent Toolman's queue as Agent Aardvark's in FIG. 5, the scoring model for the priority queue of FIG. 6 includes different weightings, such that questions about products that Agent Toolman is an expert on receive a higher score. Thus, customer 98430 is placed at the top of the queue based on his discerned likely question about a product with which Agent Toolman has significant expertise.

Figure 7:
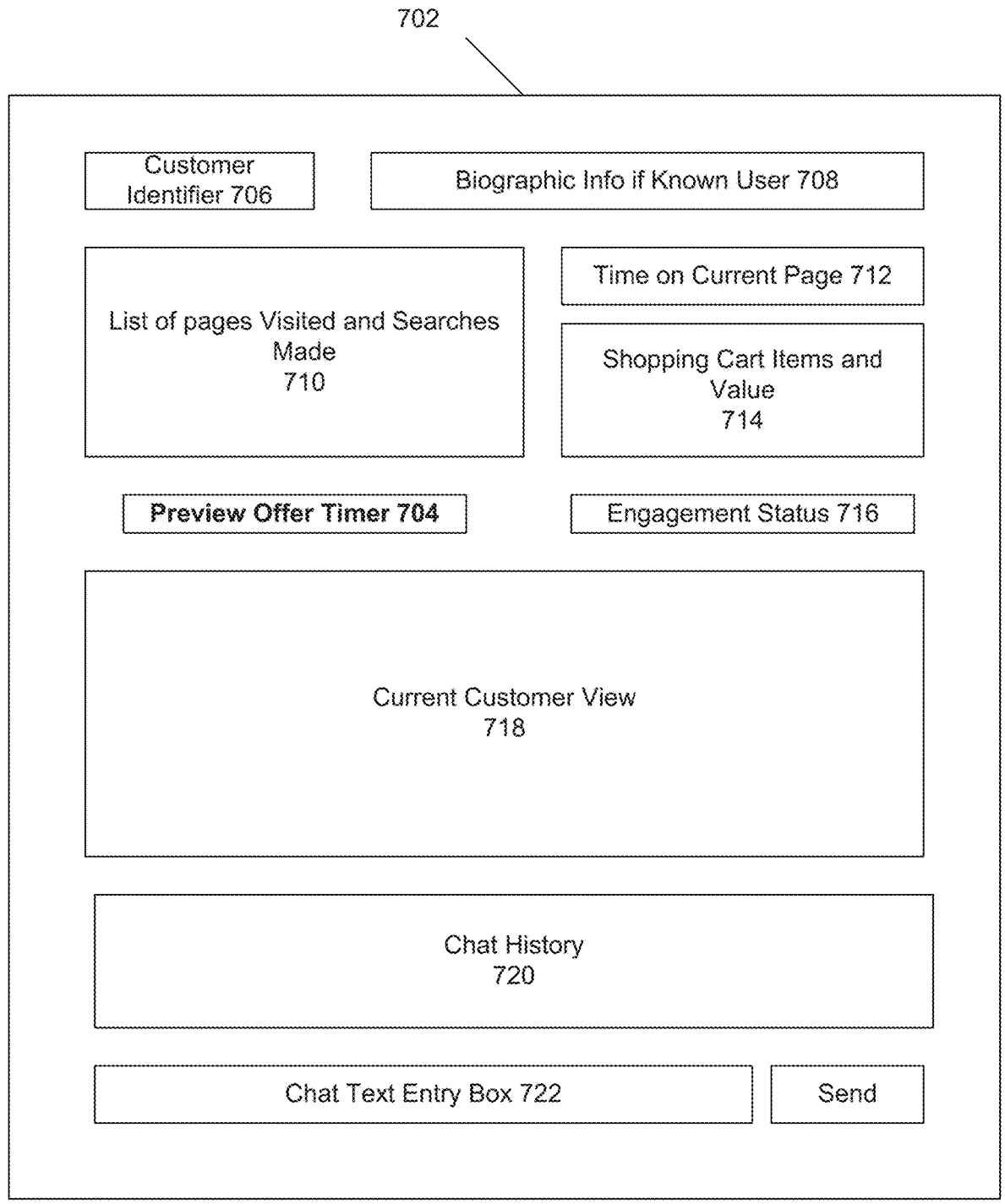
FIG. 7 is a diagram depicting another example preview work item for informing an agent on the current context of a user under consideration for contact.

FIG. 7 is a diagram depicting another example preview work item for informing an agent on the current context of a user under consideration for contact. A preview work item 702, such as the one displayed in FIG. 7, is presented to an agent before the associated user is contacted by the agent. For example, a next user in the agent's priority queue (e.g., a priority queue illustrated in one of FIGS. 4-6), is presented to the agent to allow the agent to get up to speed on the user's current activity via context information. The agent can then determine whether the user is appropriate for contacting and can initiate that contact if contact is deemed appropriate. The preview work item 702 includes a preview offer timer 704 that indicates how long the displayed user will be available for contact by the agent. Should the agent fail to act before the expiration (e.g., contacting the user or marking the user inappropriate for contact), the user, in one embodiment, is presented to another agent via another preview work item for consideration. This can prevent unfavorable results where users are not promptly contacted.

The preview work item 702 includes a variety of data that helps the agent get up to speed on the user's current state of activity. The display includes a customer identifier 706 that may be discerned via a cookie, a web site session, or log on information. If the customer is known to the system, biographic information can be presented at 708. That biographic information can include name, contact information, status, and history with the web site. In this way, the agent can discern whether the user is a frequent customer or a new user and treat them appropriately. The preview work item 702 can include a variety of data that indicates a current context of the user, so that the agent can see where the user may be having troubles that could be alleviated. Such context information can include a list of web pages visited and searches made on the web site 710. A time on current web page 712 and/or time on web site metric can provide information indicating whether the user is having trouble with navigating the web site. If the web site is an e-commerce page, a shopping cart metric display 714 can provide insight into whether the user is near making a transaction. In some embodiments, such users may be prioritized to receive very prompt attention. An engagement status control 716 indicates whether communication with the user is currently occurring and can be used by the agent to initiate such communication or to mark the user as currently inappropriate for communication (e.g., when the context information indicates that the user is likely not having any difficulties that might result in session abandonment). The preview work item 702 may also include a graphical display 718 showing the web page as the user is currently viewing it. In one example, this graphical display 718 is live, enabling the agent to see exactly or nearly exactly what the user is currently seeing, providing enhanced troubleshooting availability. The preview work item 702 further includes controls 720, 722 for facilitating live communication between the agent and the user (e.g., a proactive chat, an internet voice call, a public network telephone-based call, a call scheduling offer, an SMS, a chat-bot).

By presenting the interaction to an agent as a Preview Work Item, the agent has the time to anticipate and understand the needs or intention of the Website Visitor, research background information (such as visitor history and current offers or promotions), construct a targeted and personalized greeting and message, and engage with the visitor in the most appropriate way (Chat, Click-to-Talk or Phone Call). For example, if the Website Visitor is researching on the company website about a problem that they are experiencing with a product or service, then the agent can preview this information beforehand and reach out to the visitor proactively via a chat and delight the customer by suggesting a solution to problem that the visitor is researching. In a web sales scenario, a Website Visitor is browsing products or has several items in a shopping cart; the agent can preview the visitor's product interests then proactively engage the visitor with a specialized offer, promotion, or other initiative to close the sale with their first message to the customer.

This personalized proactive interaction system is highly time sensitive as market research indicates that the dwell time of Website Visitors on a particular page can be as short as 30-40 seconds. Systems and methods described herein address this time sensitivity by building in offer timers and engagement timers as critical components of managing how the interaction is handled by the system.

Figure 8:
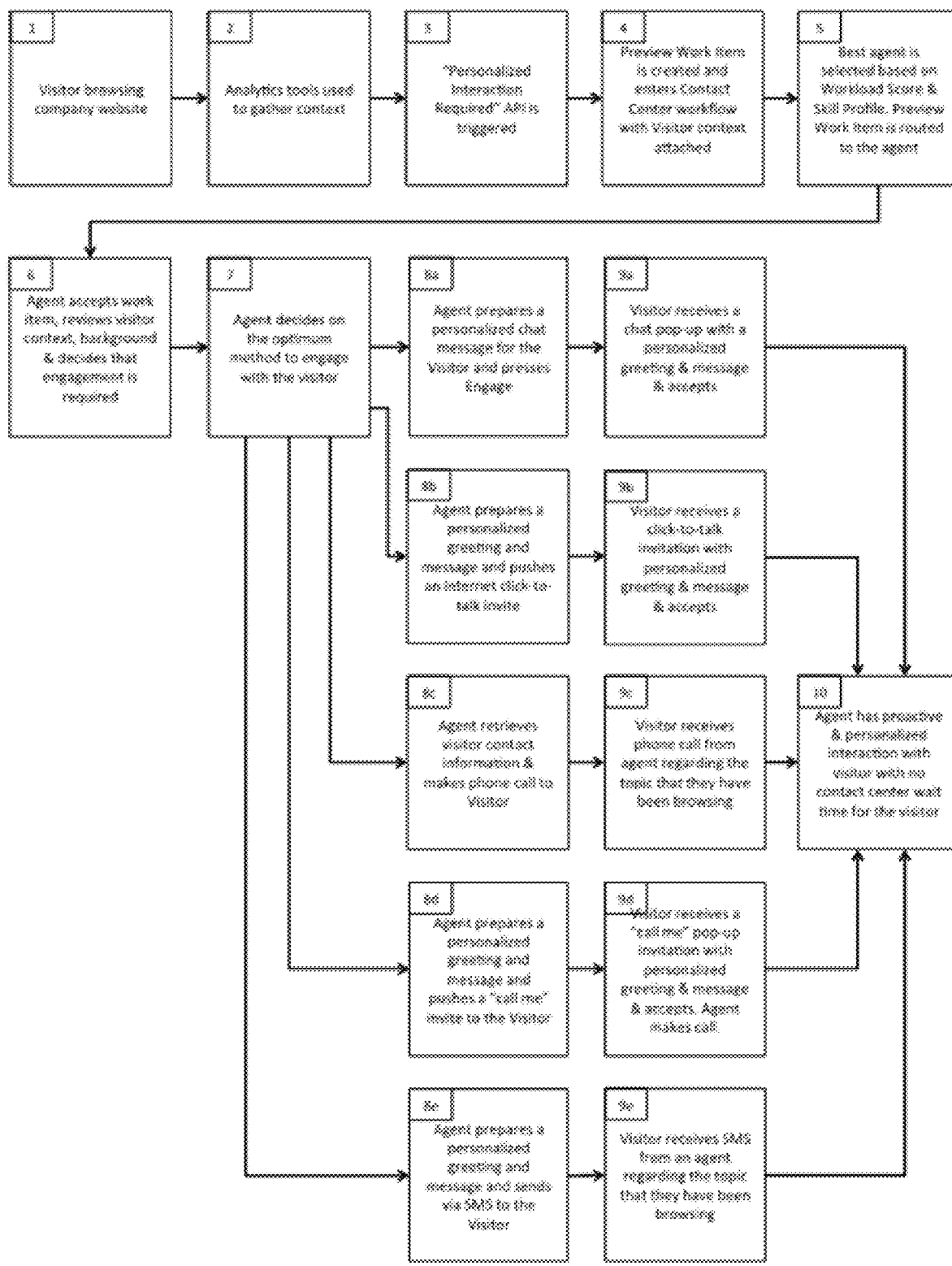
FIG. 8 is a flow diagram depicting an example implementation of a personalized proactive interaction system.

FIG. 8 is a flow diagram depicting an example implementation of a personalized proactive interaction system. Note: All three visitor/user scenarios are characterized in this description as "Website Visitor." Systems and methods described provide a method for a contact center agent to initiate a personalized proactive interaction with a Website Visitor, FIG. 8 (1), thus addressing the many shortcomings of currently available approaches.

Tools, such as web analytics engines or java script instrumentation of a web page, are used to identify a Website Visitor requiring assistance and to gather context data. Systems and methods described provide the flexibility for a wide variety of such tools to be used. FIG. 8 (2).

The tools are configured to trigger a "Personalized Interaction Required" ("PIR") API. The API creates a "Preview Work Item" and attaches the gathered Context Information. Examples of Context Information that can be used in decisioning for the Personalized Proactive Interaction are: Know Customer Identifier, web pages viewed, current page being viewed, time on page, searches conducted, value in shopping cart, items in shopping cart. Timestamps for all events are also passed via the API and used by the Contact Center Workflow to determine time sensitivity of the PIR and the necessary time limits to set for handling of the Preview Work Item. FIG. 8 (3) & (4).

The PIR API passes the Preview Work Item into the Contact Center Workflow. The workflow uses the attached Context Information, as well as look-ups to an external database, for example, a Customer Relationship Management (CRM) database, to determine the visitor need, the time sensitivity and the priority of the need. The workflow assigns a Time Sensitivity Score to the Preview Work Item. The workflow matches the Preview Work Item to an agent pool that has the skill profile that can address the customer need. The workflow selects an agent with the required skill profile that also has the necessary Workload Score to handle the Preview Work Item. The Workload Score is a real-time measurement of an agent's ability to handle the time sensitivity requirements of the Preview Work Item. It is dynamically calculated for each agent. It has a configurable weighting of; 1) the agent's current level of Assigned Work, 2) their Recent Handle Time metric, 3) their Current Message Response Time metric. The score must be within a predefined range, as set by the Contact Center Administrator, or can be a direct match to the Time Sensitivity Score as assigned by the workflow. This ensures that the selected agent can promptly handle the time-sensitive customer engagement. Agents with a Workload score outside of the predefined range are not considered by the workflow as they would be unable to react in a timely manner to the Preview Work Item. The workflow routes the Preview Work Item to the selected agent and it arrives at the agent desktop application with full context information about the Web Visitor. FIG. 8 (5). The Contact Center Workflow uses a configurable "Preview Offer Timer" to manage the time that the Preview Work Item can be offered to, but not accepted by, the agent. The Preview Offer Timer is a tool by which the time sensitivity of the interaction can continue to be actively managed at each stage in the workflow process.

The agent receives the Preview Work Item in their contact center desktop application. The arriving interaction is identified as of type "Preview" displaying essential gathered data about the Web Visitor. A display area within the Agent Desktop Application can show additional information about the Website Visitor such as a CRM record, a contact center database record, additional gathered context about the visitor or relevant promotions & offers information. The Preview Offer Timer is visible to the agent and provides a positive indication of the time in which the agent must accept the interaction or have it automatically reassigned by the workflow to an alternate agent. The gathered context is used by the agent to assist in deciding if an interaction with the visitor is appropriate. The agent is presented with an "Engage Timer" as an indication of the time that the Web Visitor's browsing behavior initially caused the Personalized Interaction Required API to be triggered. This timer provides a positive indication to the agent on the continued time sensitivity of the Preview Work Item. If the agent decides that no personalized interaction is required, they can disposition the Preview Work Item as "No Engagement Required" and close the interaction. No indication will be given to the Web Visitor that an agent chose to not interact with them. If the agent determines that an interaction with the visitor is merited, the agent uses communications tools within their contact center desktop application to proactively engage with the visitor. FIG. 8 (6) & (7).

One method for the agent to engage with the Website Visitor is using Web Chat. The agent prepares a personalized chat message which could include: a greeting that addresses the visitor by name (if a Known Customer Identifier has been collected); a chat message that refers specifically to the topic, issue or interest of the Website Visitor based on gathered context; any specific special offer or promotion information that the company wishes to incentivize the visitor with. After the agent has prepared the chat message, a press of an "Engage" button causes the personalized chat message to appear on the webpage that the visitor is viewing. FIG. 8 (8a) & (9a).

A second method for the agent to engage with the Website Visitor would be by internet voice call. As with the prior method, the agent, after receiving the "Preview Interaction" work item, gains an understanding of the needs of the Web site Visitor. The agent can then engage with the Website Visitor by sending a "Click-to-Talk" invitation to the webpage that the visitor is viewing with a personalized greeting and context-driven invitation message. The Website Visitor can accept the Click-to-Talk invitation and be connected in an internet voice call with the agent without any wait time. FIG. 8 (8b) & (9b).

A third method involves the agent using the Known Customer Identifier information to retrieve contact information on the Website Visitor from the Contact Center Database or from a CRM application. The agent then makes an outbound public network telephone call to the Website Visitor. When they Website Visitor answers their phone, the agent can greet them personally and engage with them in a discussion on the visitors item of interest the context gathered from the web visit. FIG. 8 (8c) & (9c).

A fourth method involves the agent creating a personalized contextual message for the Website Visitor and pushing the message as a "call offer" pop-up on the web page that the visitor is viewing. The pop-up offers the visitor the choice of an immediate call from the agent or a call at a future time as specified by the visitor. The visitor's phone number can be retrieved from the customer record database using the Known Customer Identifier to select the correct record and then prepopulated in a pop-up field. The visitor can change the number or add it if it has not already been prepopulated. If the visitor clicks to accept the offer, the agent receives the affirmative message and initiates the call to the visitor phone number from their contact center desktop application. FIG. 8 (8d) & (9d).

A fifth method involves the agent composing a brief personalized contextual message for the Website Visitor and sending via Short Message Service (SMS) to the mobile device number of the visitor. The visitor's mobile device number can be retrieved from the customer record database using the Known Customer Identifier to select the correct record. The agent sends the SMS which, as well as the personalized message, could include an offer to chat via SMS, a web link, instructions or promotion information. FIG. 8 (8e) & (9e).

The personalized greeting, context-driven message content and no wait time for a contact center agent creates a superior experience for the Website Visitor. FIG. 8 (10).

Contact Center Supervisors and Administrators are provided with insight into the operation and effectiveness of the Personalized Proactive Interactive system by real-time dashboards and historical reports that track the handling of the Preview Work Items. This includes the number of items, the decision factors for agent selection, the agents assigned the Preview Work Items, the time performance for acceptance by agents of the work items, the time performance for agents to engage with the Website Visitor, the disposition by the agent of the Preview Work Item.

Figure 9:
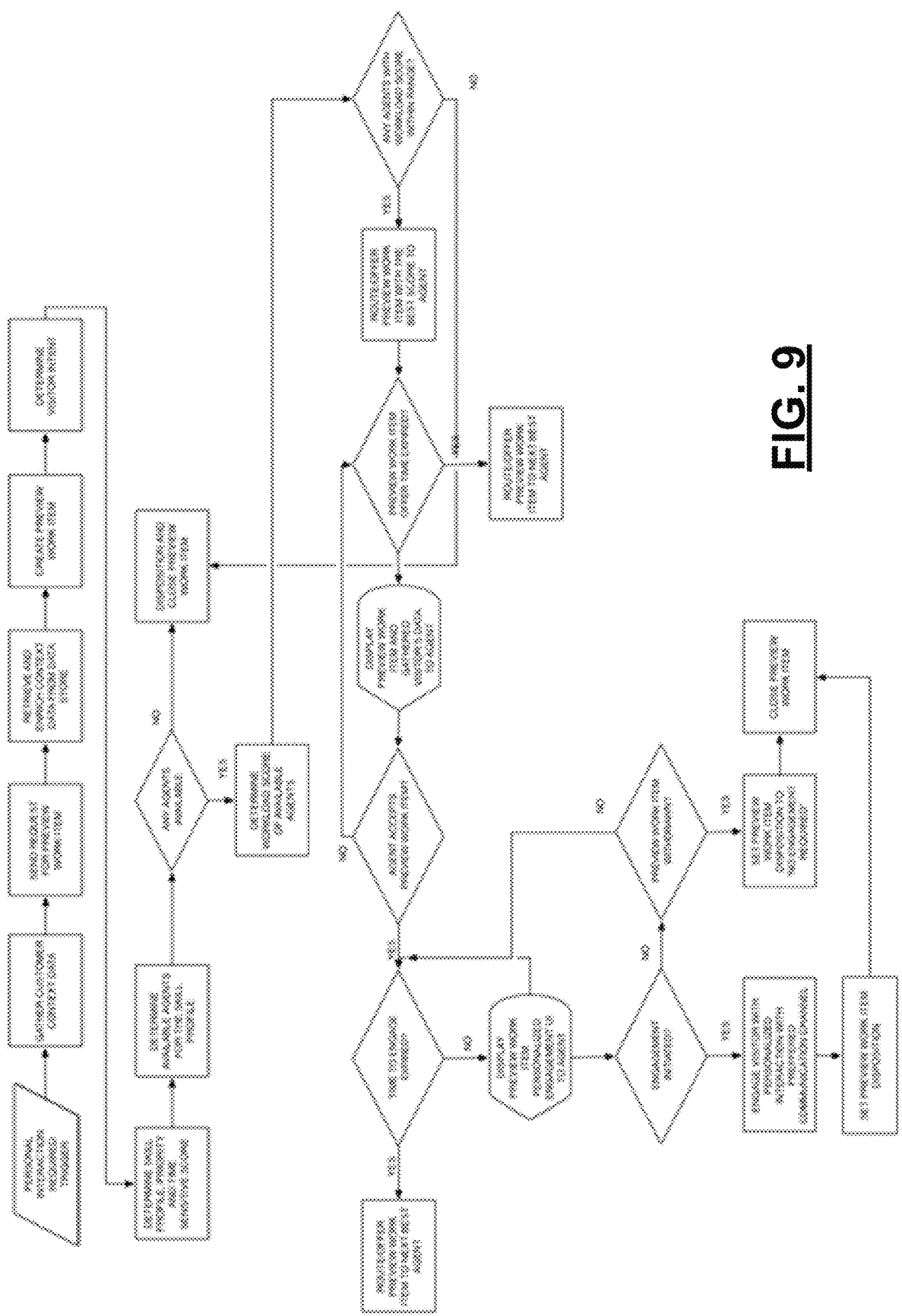
FIG. 9 is a flow diagram depicting another example implementation.

FIG. 9 is a flow diagram depicting another example implementation. In that example, a trigger is received at the system indicating that a user possibly could use a proactive interaction. Context data for the customer is gathered and a request for a preview work item is generated and sent. Additional data (e.g., data about a known customer) is accessed from a data store, and the preview work item is created. The context and data store data is used to determine a likely visitor intent. The user's need is scored for prioritizing, such as by identifying needed skills of a helper-agent, how much the user needs help, and how urgent that need is. Available agents are evaluated to determine an agent who should receive the preview work item. If one or more agents are available, the preview work item is sent to the most qualified of the available agents (e.g., the agent who has the user at the top of their priority queue). If that agent does not act on the preview work item by the expiration of the offer time, then the work item is routed to a different agent. If the selected agent acts, the preview work item is displayed for acceptance. If the agent accepts the work item, the agent has an opportunity to engage the user. The system then facilitates that engagement if accepted, reroutes the user engagement if not accepted, and closes the work item if/when the user need is resolved (e.g., the user completes a purchase, the user logs off of the web site).

FIG. 10 is a flow diagram depicting a computer-implemented method of synchronizing communications between two disparate computing systems. At 1002, a system includes a context capture module configured to capture interactions of a first computing system with an application to determine a current context of the first computing system's interactions. A communications initiation engine is configured to determine, at 1004, one of a plurality of other computing systems is to be queried for communication with the first computing system. When one of the other computing systems is to be queried, an initiation communication is provided to a particular one of the other computing systems at 1006, wherein the initiation communication includes data describing the current context of the first computing system's interactions. An availability indication is received from the particular other computing system at 1008, and a communications module is configured to facilitate communications between the first computing system and the particular other computing system at 1010.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents. For example, another example system can be described as follows.

The preview work item can be configured to be auto-accepted so when it is delivered to an agent in which case the agent will automatically be made the owner of the preview work item once it has been delivered to the agent.

The preview work item can also be configure to auto-engage which allows a pre-canned message to display to the customer once the proactive preview interaction is accepted by agent either by auto-accept or manual accept of the proactive preview interaction.

It is claimed:

1. A system for synchronizing communications between two disparate computing systems, comprising:
   a processor and non-transitory computer-readable medium that stores instructions for executing by the processor, the instructions comprising:
   a context capture module configured to capture interactions of a first computing system with an application to determine a current context of the first computing system's interactions;
   a communications initiation engine configured to:
      determine one of a plurality of other computing systems is to be queried for communication with the first computing system;
      when one of the other computing systems is to be queried, provide an initiation communication to a particular one of the other computing systems, wherein the initiation communication includes data describing the current context of the first computing system's interactions, wherein the data describing the current context of the first computing system's interactions includes:
         biographic information associated with the first computing system,
         historic data associated with the first computing system's previous interactions with the application,
         timing data associated with a length of time of the first computing system's current interactions,
         shopping cart data comprising a status of one or more items in a shopping cart accessed by the first computing system, and
         outcome probability data indicating a likelihood of different future interactions of the first computing system; and
      receive an availability indication from the particular one of the other computing systems based on the data describing the current context of the first computing system's interactions,
   a communications module configured to facilitate communications between the first computing system and the particular one of the other computing systems.

2. The system of claim 1, wherein, when the availability indication is not received, providing the initiation communication to a different one of the other computing systems.

3. The system of claim 1, wherein the particular one of the other computing systems is selected to receive the initiation communication based on a count of communications with which the particular one of the other computing systems is currently involved.

4. The system of claim 1, wherein the particular one of the other computing systems is selected to receive the initiation communication based on an expertise of an operator of the particular one of the other computing systems, a priority associated with the first computing system, or a time associated with the first computing system.

5. A method for synchronizing communications between two disparate computing systems, comprising:
   capturing interactions of a first computing system with an application to determine a current context of the first computing system's interactions;
   determining one of a plurality of other computing systems is to be queried for communication with the first computing system;
   when one of the other computing systems is to be queried, providing an communication to a particular one of the other computing systems, wherein the initiation communication includes data describing the current context of the first computing system's interactions, wherein the data describing the current context of the first computing system's interactions includes:
      biographic information associated with the first computing system,
      historic data associated with the first computing system's previous interactions with the application,
      timing data associated with a length of time of the first computing system's current interactions,
      shopping cart data comprising a status of one or more items in a shopping cart accessed by the first computing system, and
      outcome probability data indicating a likelihood of different future interactions of the first computing system;
   receiving an availability indication from the particular one of the other computing systems based on the data describing the current context of the first computing system's interactions; and
   facilitating communications between the first computing system and the particular one of the other computing systems.

6. The method of claim 5, wherein the application is a web page, the first computing system is a computing system of a customer of the web page, and the other computing systems are computing systems of agents helping customers of the web page;
   wherein the interactions are interactions of the customer with the web page, and
   wherein the current context is based on an identity of the webpage that the customer is currently on; wherein the initiation communication is a communication to a particular agent, wherein the communication prompts the particular agent to consider entering into a live communication with the customer.

7. The method of claim 5, wherein one of the other computing systems is to be queried upon a determination that a user of the first computing system needs help with getting more information about a product or service or completing a sale.

8. The method of claim 7, wherein a first other computing system is queried when it is determined that the user needs help with getting more information about a product or service associated with the web page that the first computing system is currently interacting with; and wherein a second other computing system is queried when it is determined that the user needs help with completing the sale; wherein the first or second other computing system is selected based on an expertise of agents of the first and second other computing systems.

9. The method of claim 5, wherein the initiation communication includes display of a preview work item that displays information associated with the current context, wherein the preview work item displays: an identity of a user of the first computing system, a history of web pages on a current web site visited by the user, a time of the user on a current web page, a total time of the user on the current web site, and a shopping cart status of the user.

10. The method of claim 9, wherein the preview work item includes a preview offer timer, wherein the preview offer timer indicates an amount of time until a second other computing system will be queried for communications with the first computing systems if the availability indication is not received from the particular one of the other computing systems.

11. The method of claim 9, wherein the preview work item includes a control for initiating communication with the first computing system via the availability indication or declining to initiate communication with the first computing system.

12. The method of claim 9, wherein the identity of the user is based on a session identifier, a cookie, or a username entered by the user.

13. The method of claim 9, wherein the preview work item displays a status of the user accessed from a data store.

14. The method of claim 13, wherein the status indicates whether it is known that the user has interacted with a website that the first computing system is currently interacting with, and whether it is known that the user has purchased a good or service from the website.

15. A non-transitory computer-readable medium encoded with instructions for commanding one or more data processors to execute steps of a method for synchronizing communications between two disparate computing systems, the method comprising:
  capturing interactions of a first computing system with an application to determine a current context of the first computing system's interactions;
  determining one of a plurality of other computing systems is to be queried for communication with the first computing system;
  when one of the other computing systems is to be queried, providing an initiation communication to a particular one of the other computing systems, wherein the initiation communication includes data describing the current context of the first computing system's interactions, wherein the data describing the current context of the first computing system's interactions includes:
    biographic information associated with the first computing system,
    historic data associated with the first computing system's previous interactions with the application,
    timing data associated with a length of time of the first computing system's current interactions,
    shopping cart data comprising a status of one or more items in a shopping cart accessed by the first computing system, and
    outcome probability data indicating a likelihood of different future interactions of the first computing system;
  receiving an availability indication from the particular one of the other computing systems based on the data describing the current context of the first computing system's interactions; and
  facilitating communications between the first computing system and the particular one of the other computing systems.

* * * * *